(12) United States Patent
Mun et al.

(10) Patent No.: US 12,085,496 B2
(45) Date of Patent: Sep. 10, 2024

(54) APPARATUS AND METHOD FOR HIGH-ACCURACY OPTICAL PARTICLE MEASURING USING LASER POWER SCANNING

(71) Applicant: KOREA RESEARCH INSTITUTE OF STANDARDS AND SCIENCE, Daejeon (KR)

(72) Inventors: Ji Hun Mun, Daejeon (KR); Sang Woo Kang, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 255 days.

(21) Appl. No.: 17/763,279

(22) PCT Filed: Aug. 10, 2021

(86) PCT No.: PCT/KR2021/010552
§ 371 (c)(1),
(2) Date: Mar. 24, 2022

(87) PCT Pub. No.: WO2022/114452
PCT Pub. Date: Jun. 2, 2022

(65) Prior Publication Data
US 2023/0168176 A1 Jun. 1, 2023

(30) Foreign Application Priority Data
Nov. 24, 2020 (KR) .................. 10-2020-0158562

(51) Int. Cl.
*G01N 15/14* (2024.01)
*G01N 15/1429* (2024.01)

(52) U.S. Cl.
CPC . *G01N 15/1429* (2013.01); *G01N 2015/1486* (2013.01); *G01N 2015/1493* (2013.01)

(58) Field of Classification Search
CPC ....... G01N 15/1429; G01N 2015/1486; G01N 2015/1493
See application file for complete search history.

(56) References Cited

FOREIGN PATENT DOCUMENTS

| JP | 5326120 B2 | 10/2013 | |
|---|---|---|---|
| KR | 2002-090284 A | 3/2002 | |
| KR | 10-1264075 B1 | 5/2013 | |
| KR | 10-2019-0101564 A | 9/2019 | |
| KR | 102073483 B1 * | 2/2020 | ......... G01N 15/0211 |

* cited by examiner

*Primary Examiner* — Jamil Ahmed
(74) *Attorney, Agent, or Firm* — Goldilocks Zone IP Law

(57) ABSTRACT

The present invention relates to particle measuring apparatus and a particle measuring method, whereby particle counts per size range can be measured with a high accuracy using a laser power scanning in which lasers of several powers are sequentially irradiated. First, minimum powered lasers capable of measuring particles having more than relevant size are irradiated to a particle measurement space for a predetermined time in response to plural counts of each mutually different particle size, and the counts of particles per size are measured by detecting a scattered light. Furthermore, the counts of particles belonging to each size range can be accurately calculated through an algorithm using the actually measured value.

12 Claims, 6 Drawing Sheets

P1: MINIMUM POWER MEASURABLE OF PARTICLE SIZE OVER R1

P2: MINIMUM POWER MEASURABLE OF PARTICLE SIZE OVER R2

...

Pm: MINIMUM POWER MEASURABLE OF PARTICLE SIZE OVER Rm

$$R_1 < R_2 \ldots < R_m$$

$$P_1 > P_2 \ldots > P_m$$

LASER IRRADIATION SEQUENCE : $P_m \rightarrow P_1$

APPARATUS AND METHOD FOR HIGH-ACCURACY OPTICAL PARTICLE MEASURING USING LASER POWER SCANNING

CROSS-REFERENCE TO RELATED APPLICATIONS

This application claims the benefit under 35 U.S.C. section 371, of PCT International Application No. PCT/KR2021/010552, filed on Aug. 10, 2021, which claims foreign priority to Korean Patent Application No. KR 10-2020-0158562, filed on Nov. 24, 2020, in the Korean Intellectual Property Office, both of which are hereby incorporated by reference in their entireties.

TECHNICAL FIELD

The present invention relates to a particle measuring apparatus and a particle measuring method, and more particularly to an apparatus and method for high-accuracy optical particle measuring using laser power scanning (hereinafter also referred to as a high-accuracy optical particle measuring apparatus and method using laser power scanning) configured to measure the counts (numbers) of particles per size range at a high accuracy without using an additional part such as a flow nozzle or flattop optical system by using a laser power scanning that irradiates lasers of several powers necessary for measuring particles per size range.

BACKGROUND ART

In general, processes that require a high accuracy such as a semiconductor process or an LCD process may result in a fatal product defect when contaminant particles are generated above a predetermined level within a process chamber, such that the processes are implemented under a strictly restricted condition.

As a result, a contaminant particle measurement inside a chamber is required for contamination control. As one of the contaminant particle measurement methods, a particle distribution state in a particular chamber may be measured in real time using an optical measurement apparatus.

An optical particle measuring apparatus employs a principle in which intensity of scattered light generated when a laser hits a particle is transformed to a size.

The particle size may become smaller as the intensity of scattered light becomes smaller, which can be calculated through a Mie theory. The intensity of scattered light is proportionate to the intensity of incident light, such that the intensity of incident light must be strong in order to measure a particle of small size.

Because of this rationale, a laser must be inevitably focused in order to measure a particle of small size.

Figure 1:
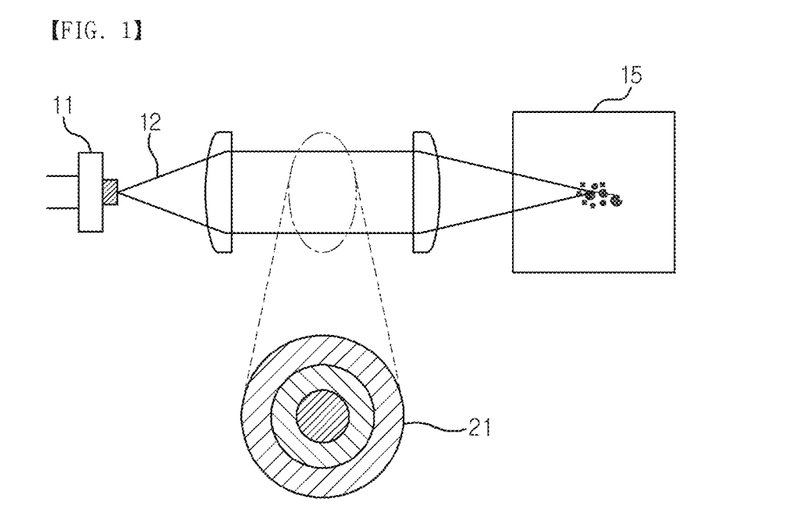
FIG. 1 is an example of explaining the measurement of particles using focusing of light.

FIG. 1 illustrates a schematic view in which an incident light (12) generated from a laser source (11) is focused on a f low channel (15) by passing though several optical parts. Here, the flow channel (15) is a space where measurement target particles exist.

Referring to the following Mathematical Expression, the intensity (Io) of incident light must be constant for measurement of accurate particle size using the Mie theory.

$$I_{scat} = I_0 \frac{1}{R^2} \sigma'_{scat}$$

Here, $I_{scat}$ is an intensity of scattered light and R is a distance from a scattered light occurrence point to a detector and $\sigma_{scat}'$ is a function of particle size.

At this time, the intensity of scattered light relative to particles of same size may differ depending on at which position of focused incident light the particles pass.

This is because a cross-section (21) of light is not uniform relative to an r axis direction. Because of this rationale, when the scattered light is transformed to a particle size, a same particle may be recognized as having a different size, even if the same particle is measured, and as a result, an optical particle measuring apparatus cannot measure an accurate size.

In order to solve the accuracy problem regarding a particle size measurement, the following technique has been conventionally employed.

Figure 2:
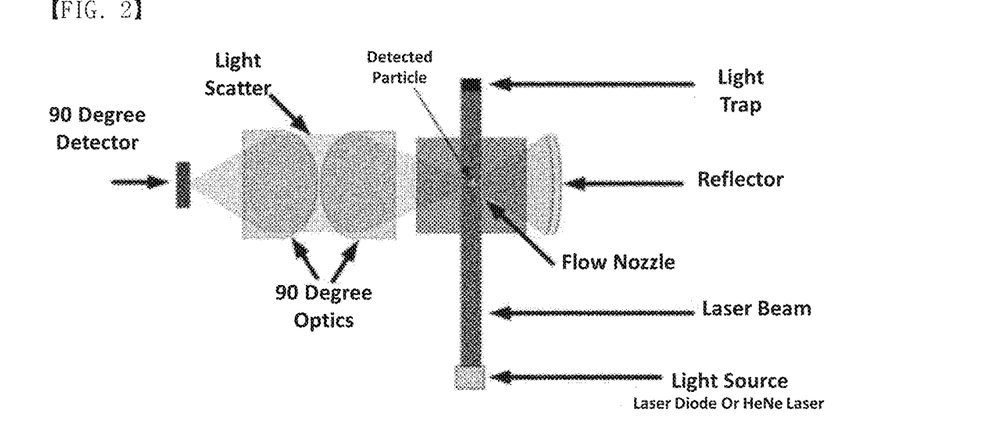
FIG. 2 is an example of using a flow nozzle in the measurement of particles.

First, as illustrated in FIG. 2, a method may be used that allows particles to pass to a particular position of incident light using a flow nozzle.

When this method is used, because the particles pass only to a designated position of incident light, the intensity of incident light becomes constant to enable to measure the size accurately.

Most of the contaminant particle detectors currently employ this method. However, although this method may be useable under an atmospheric pressure condition, the said method is difficult to be used by a process sensitive to pressure change such as by a vacuum process. Particularly, the said method can trigger an influence on a process condition to disable to be used in semi-conductor industrial sites.

Furthermore, the said method requires an additional cost for making a flow nozzle, which generates a phenomenon of the f low nozzle being blocked by particles, thereby causing a difficulty in control.

Figure 3:
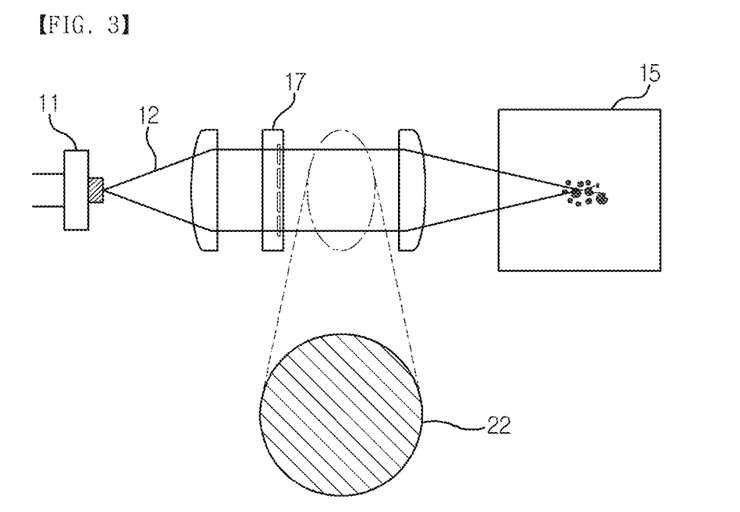
FIG. 3 is an example of a method enabling an r direction intensity of a light to be uniform.

In another method as exemplified in FIG. 3, a technique entitled as "a high accuracy real time apparatus for measuring size and count of fine particles" under registered patent No.: 10-1857950 discloses that the intensity of light is made uniform using a flat top (17) module, whereby the size of particles can be more accurately measured.

That is, the registered patent No.: 10-1857950 employs a method that makes uniform an intensity of an r axis direction of incident light (12), which is a cross-section (22) of light, in order to solve the problem of size measurement accuracy based on intensity change of incident light.

When an optical system (lens) that makes the incident light uniform is constituted, the intensity of incident light of an r axis direction can be uniformly made and the size of scattered light is not changed regardless of the passing position of the particles.

However, a particle measuring apparatus that employs the said method requires the importance of configuration of optical system, and must use an aspherical optical system, which increases a manufacturing cost geometrically, and rendering a problem of impossibility in measuring nano-sized particles due to the intensity of focused light being weaker than that of the general focused light.

DETAILED DESCRIPTION OF THE INVENTION

Technical Subject

The present invention is devised to solve the aforementioned problems and it is an object of the present invention to provide a high-accuracy optical particle measuring apparatus configured to measure the count (number) of particles per size range with a high accuracy using a laser power scanning that irradiates lasers of several powers necessary for measuring particles per size range.

Another object of the present invention is to provide a high-accuracy optical particle measuring method configured to measure the counts of particles per size range with a high accuracy using a laser power scanning.

Technical Solution

In one general aspect of the present invention, there may be provided a high-accuracy optical particle measuring apparatus using a laser power scanning according to the present invention, the apparatus comprising:

a light irradiation part irradiating a minimum powered laser capable of measuring only particles having more than relevant size to a particle measurement space for a predetermined time respectively in response to plural counts of each mutually different particle size (R1, R2, . . . , Rm); and a measuring part measuring the counts of particles per size by allowing the laser irradiated through the light irradiation part to detect a light scattered from particles in the particle measurement space.

At this time, the measuring part may be so configured as to calculate the counts of particles belonging to a particular section by using the counts of particles measured through each laser irradiation.

Preferably but not necessarily, the light irradiation part may continuously irradiate without interruption the minimum powered lasers respectively in response to each mutually different particle size.

Preferably but not necessarily, the light irradiation part may sequentially irradiate starting from a smaller powered laser respectively in response to each mutually different particle size.

Preferably but not necessarily, the count of particles belonging to the particular section may be calculated through an algorithm using a proportional relationship between the count of measured particles and powers of irradiated laser.

Preferably but not necessarily, the measuring part may measure the counts of particles per size range based on a mathematical expression of "$ni=ni[P1]+ni[P2]+ \ldots +ni[Pk]$", when, ni is a count of particles of size range Ai ($R1 \le Ai < R(i+1)$) to be calculated, Pk is a minimum laser power measurable of particle of size Rk, ni[Pk] is a count of particles of size range Ai that is measured when a laser having the power of Pk is irradiated, and N[Pk] is a total count of particles measured when a laser having a power Pk is irradiated, wherein $ni[Pk]=0, (i<k)$, $ni[Pk]=ni[Pk], (i=k)$, $ni[Pk]=(Pi/Pk) \times ni[Pi], (i>k)$.

In another general aspect of the present invention, there may be provided a high-accuracy optical particle measuring method using a laser power scanning according to the present invention, the method comprising:

irradiating, by a light irradiation part, a minimum powered laser capable of measuring only particles having more than relevant size to a particle measurement space for a predetermined time in response to plural counts of each mutually different particle size (R1, R2, . . . , Rm) (first step); and measuring, by a measuring part, the counts of particles by detecting a light scattered from particles in the particle measurement space (second step).

Preferably but not necessarily, the method may include calculating, by the measuring part, the counts of particles belonging to a particular using the counts of particles measured through the first step and the second step.

In still another general aspect of the present invention, there may be provided a high-accuracy optical particle measuring method using a laser power scanning according to the present invention, the method comprising:

receiving an input of an actually measured value for the counts of particles measured in response to each mutually different plural particle size (R1, R2, . . . , Rm), where the actually measured value for the counts of particles is defined by the count of particles measured by detecting a light scattered from particles in the particle measurement space while irradiating a minimum powered laser capable of measuring only particles having more than relevant size to a particle measurement space for a predetermined time in response to each size (inputting step); and calculating the counts of particles belonging to a particular section using the actually measured value of counts of the inputted particles (calculating step).

Preferably but not necessarily, the calculating step may include measuring the counts of particles per size range based on a mathematical expression of "$ni=ni[P1]+ni[P2]+ \ldots +ni[Pk]$", when, ni is a count of particles of size range Ai ($R1 \le Ai < R(i+1)$) to be calculated, Pk is a minimum laser power measurable of particle of size Rk, ni[Pk] is a count of particles of size range Ai that is measured when a laser having the power of Pk is irradiated, and N[Pk] is a total count of particles measured when a laser having a power Pk is irradiated, wherein $ni[Pk]=0, (i<k)$, $ni[Pk]=ni[Pk], (i=k)$, $ni[Pk]=(Pi/Pk) \times ni[Pi], (i>k)$.

Advantageous Effects of the Invention

The present invention has an advantageous effect in that the count of particles per size range can be measured with a high accuracy by using a laser power scanning that sequentially irradiates a laser of power necessary for measuring particles per size range.

The present invention has another advantageous effect in that an additional part such as a flow nozzle or a flat-top optical system is dispensed with to thereby reduce a development cost of particle measurement device and to allow being used regardless of atmospheric pressure or vacuum environment.

The present invention has still another advantageous effect in that a particle measurement device improved in accuracy can be developed using algorithm and the accuracy can be also improved through algorithm upgrade on the conventional device.

BEST MODE

The present invention may be embodied in many different modifications and alterations and have several exemplary embodiments, where specific exemplary embodiments will be exemplified through drawings which are to be described in details in the detailed descriptions. However, it should be appreciated that the present invention is not intended to be limited to particular exemplary embodiments but to encompass equivalent alterations and/or modifications within the scope and spirit of the present invention.

In describing the present invention, detailed descriptions of constructions or processes known in the art may be omitted to avoid obscuring appreciation of the invention. The terminology used herein is for the purpose of describing particular implementations only and is not intended to be limiting of the invention. A singular expression includes a plural expression unless the context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

Terms including ordinal numbers such as first, second, etc. may be used to explain various elements. However, it will be appreciated that the elements are not limited to such terms. These terms are merely used to distinguish one element from another.

Figure 4:
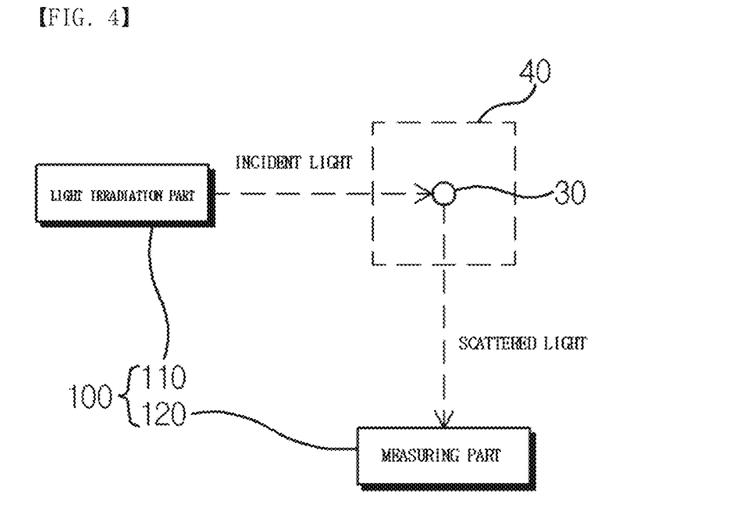
FIG. 4 illustrates a high-accuracy optical particle measuring apparatus according to an exemplary embodiment of the present invention.

Referring to FIG. 4, a high-accuracy optical particle measuring apparatus (100) using a laser power scanning according to the present invention may include a light irradiation part (110) configured to irradiate a laser having two or more powers each having a mutually different size to a particle measurement space (40), and a measuring part (120) configured to measure the counts of particles by detecting, by the laser irradiated through the light irradiation part (110), a light scattered from a particle (30) of the particle measurement space (40).

The power of laser irradiated from the light irradiation part (110) is set in response to each of a plurality of counts of mutually different particle sizes (R1, R2, . . . , Rm) and is defined by a minimum power capable of measuring particles of more than each size.

That is, in order to measure particles of smaller size, a laser of more power must be irradiated, and in order to measure particles of larger size, a laser of smaller power may be irradiated. In a detailed example, when a minimum laser power for measuring particles with a diameter of more than 500 nm is 100 W, a minimum laser power for measuring particles with a diameter of more than 700 nm will be sufficient with 80 W.

Sizes (R1, R2, . . . , Rm) for a plurality of mutually different particles corresponding to each laser power may be defined by a lower limit of size range for measuring the particle count.

Figure 5:
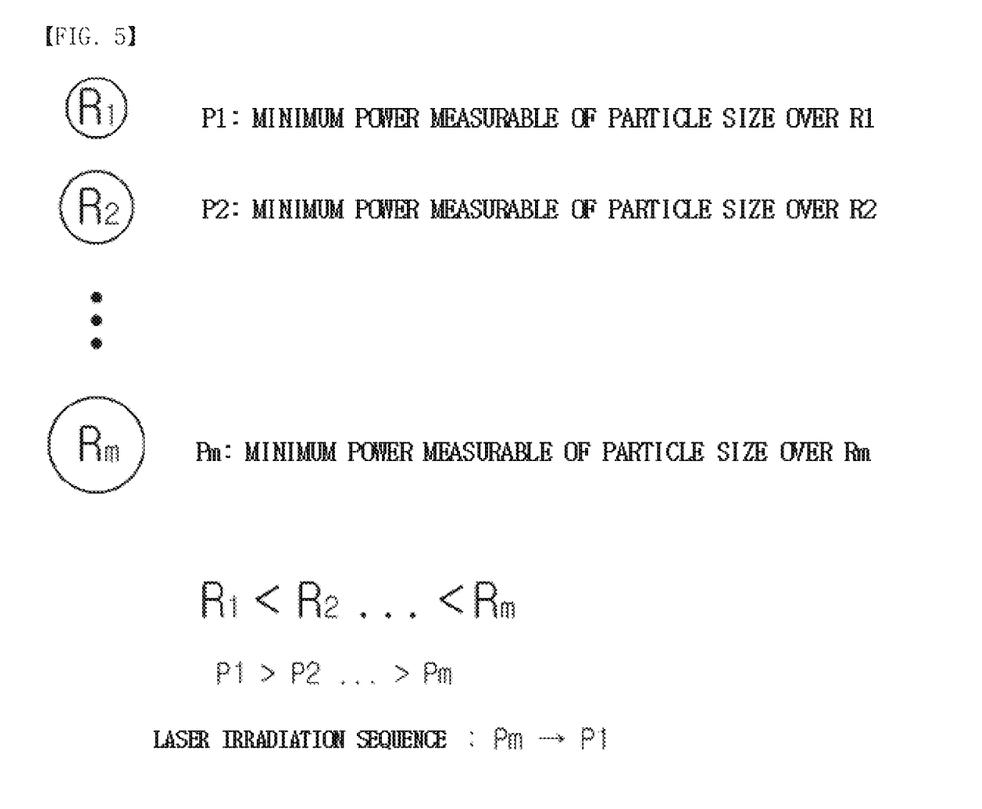
FIG. 5 is an example of explaining lasers of different powers being used for particles per size range.

As shown in FIG. 5, explanation will be provided hereunder assuming that a minimum laser power necessary for measuring a particle with a size R1 is P1, a minimum laser power necessary for measuring a particle with a size R2 is P2, and a minimum laser power necessary for measuring a particle with a size Rm is Pm.

Here, the greater the subscript number of R is, the greater the particle size is. As a result, as the subscript number of P grows greater, the laser power grows smaller.

The light irradiation part (110) may sequentially irradiate, for a predetermined period of time, a minimum powered laser capable of measuring particles over a relevant size respectively in response to mutually different particle sizes. The predetermined period of time for irradiating the respectively powered lasers may be variably formed as needed, and therefore, the present invention is not limited thereto. For example, the respectively powered laser may be irradiated per 10 seconds.

The light irradiation part (110) may continuously irradiate lasers of powers respectively corresponding to the mutually different particle sizes without interruption.

Furthermore, the light irradiation part (110) may sequentially irradiate starting from a laser of smaller power when irradiating lasers of powers respectively corresponding to the mutually different particle sizes. That is, as shown in FIG. 5, the light irradiation part (110) may sequentially irradiate from Pm to P1.

Furthermore, the measuring part (120) may measure the counts of particles per size by allowing the laser irradiated through the light irradiation part (110) to detect a light scattered from particles existing in the particle measurement space.

The size range calculated by the measuring part (120) while dividing (classifying) the counts of particles may be variably formed.

Particularly, the measuring part (120) may be so formed as to calculate the counts of particles belonging to a section between adjacent two sizes of mutually different particles using the counts of particles measured through each laser irradiation.

For example, when a size range calculated by allowing the measuring part (120) to divide the counts of particles is Ai, the size range may be so formed as to include at least '$Ri \leq Ai < R(i+1)$)' relative to R1 of each particle size.

Referring to the abovementioned imaginary example where a minimum laser power for measuring a particle with a diameter greater than 500 nm is 100 W, and a minimum laser power for measuring a particle with a diameter greater than 700 nm is 80 W, the measuring part (120) may calculate the counts of particles with sizes 500 nm or more but smaller than 700 nm, and the counts of particles with sizes 700 nm or more.

The count of particles measured by irradiating a laser of 80 W power is the count of particles with a diameter greater than 700 nm, and the count of particles measured by irradiating a laser of 100 W power is the count of particles with a diameter greater than 500 nm, such that the counts of particles with a diameter greater than 500 nm but smaller than 700 nm must be rationally calculated using this information.

The methods therefor may be variably implemented. As one of the examples, the counts of particles belonging to each section may be calculated through algorithm using a proportional relationship between the counts of measured particles and the powers of lasers that are irradiated.

Figure 9:
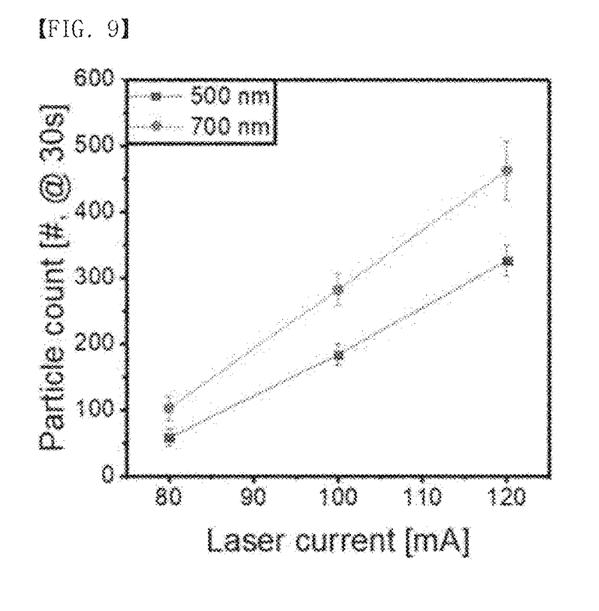
FIG. 9 is an example of showing a relationship between the counts of measured particles and laser power.

FIG. 9 illustrates an example of a graph showing a relationship between counts of measured particles and laser powers, which is an experimental result measured by changing the laser powers to counts of particles with a particle size respectively of 500 nm and 700 nm. As shown in the experimental graph, the counts of measured particles may be proportionate to the laser powers.

Now, using the abovementioned example, methods for calculating the counts of particles belonging to each size range will be hereinafter explained.

In view of the fact that the scattered light of a certain level measurable by the measuring part (120) may be generated by the scattering from particles when intensity of incident light reaches more than a predetermined value, it is assumed that a minimum laser power for measuring a particle with a diameter more than 500 nm is 100 W, and a minimum laser power for measuring a particle with a diameter more than 700 nm is 80 W.

In view of the fact that a minimum power necessary for measuring a certain size of particle may be defined by a laser power that generates a scattered light of detectable level, when a laser of 80 W power in the above example is irradiated, the scattered light cannot be detected, if ever generated, from a particle with a diameter smaller than 700 nm due to undetectable level, and may thereby be buried in noises.

First, particles are measured for a predetermined period of time (e.g., 10 seconds) using a 80 W laser power. Then, because measured signals were generated from particles with a diameter size greater than 700 nm, all the measured signals are counted as counts (numbers) of particles with a diameter size greater than 700 nm.

Now, particles are measured for 10 seconds using a 100 W laser power. Then, because the measured signals were generated from particles with a diameter size greater than 500 nm, all the measured signals are counted as counts (numbers) of particles with a diameter size greater than 500 nm.

Here, the particle measuring process using the 100 W laser power is implemented immediately after the particle measuring process using the 80 W laser power.

It is assumed that the counts (numbers) of particles measured for 10 seconds using the 80 W laser power is 1,000, and it is assumed that that the counts (numbers) of particles measured for 10 seconds using the 100 W laser power is 2,000.

When the counts of particles per size range measured for 10 seconds using the 80 W laser power are 1,000, it can be determined that the counts of measured particles per '500~700 nm' size range are zero, and the counts of measured particles greater than 700 nm are 1,000. The particles smaller in size than 700 nm are not measured.

Next, when the counts of particles per size range measured for 10 seconds using the 100 W laser power are 2,000, the counts of particles per size range may be calculated under an assumption of proportional relationship between the counts of measured particles and the laser power.

That is, the counts of particles greater in size than 700 nm measured using 80 W laser power may be used.

Then, the counts of particles greater in size than 700 nm measured through the 100 W power laser may be calculated by the following Mathematical Expression 1.

$$(100W/80W) \times 1,000 = 1,250 \quad \text{[Mathematical Expression 1]}$$

Therefore, a total count (2,000) of particles greater in size than 500 nm may be calculated from the count of particles of 500-700 nm being 750 (2,000-1,250), and the count of particles greater than 700 nm being 1,250.

Now, if the total counts of particles per size range measured for 20 seconds is put together:

The count of particles in size of 500~700 nm: 750
The count of particles greater than 700 nm: 2,250.

It can be appreciated from the above example that, when the laser power is twice adjusted, the size range of particles can be divided to two. As noted above, when the laser power is adjusted by m times, it can be understood that the size range of particles can be divided or classified to m pieces.

A detailed exemplary embodiment calculating, by the measuring part (120), the count of particles per size range is based on the calculation from the following Mathematical Expression 2.

$$ni = ni[P1] + ni[P2] + \ldots + ni[Pk], \quad \text{[Mathematical Expression 2]}$$

where, ni, which is a value sought to be calculated, is the count of particles belonging to each size range $Ai(R1 \leq Ai < R(i+1))$, Pk is a minimum laser power measurable of size Rk particle, ni[Pk] is the count of particle of size range Ai measured when a laser having a Pk power is irradiated, and N[Pk] is a total count of particles measured when a laser having a Pk power is irradiated.

Furthermore, $$ni[Pk] = 0, (i < k),$$

$$ni[Pk] = ni[Pk], (i = k), \text{ and}$$

$$ni[Pk] = (Pi/Pk) \times ni[Pi], (i > k).$$

When the Mathematical Expression 2 is applied to the above example where the 80 W and 100 W lasers are irradiated, n1 (the count of particles belonging to 500~700 nm size range) and n2 (the count of particles greater in size than 700 nm) may be defined by the following Mathematical Expression 3.

$$n1 = n1[P1] + n1[P2]$$

$$n2 = n2[P1] + n2[P2], \quad \text{[Mathematical Expression 3]}$$

where n1[P2] = 0,
n2[P1] = (100/80) × 1,000 = 1,250,
n1[P1] = 2,000 − 1,250 = 750 (because n1[P1]+n2[P1]=2,000), and,
n2[P2] = 1,000 (because n1[P2]+n2[P2]=1,000).

That is, as calculated above, it can be appreciated that n1 (the count of particles within 500~700 nm size range) is calculated to be as 750, and n2 (the count of particles greater in size than 700 nm) is calculated to be as 2,250.

Figure 6:
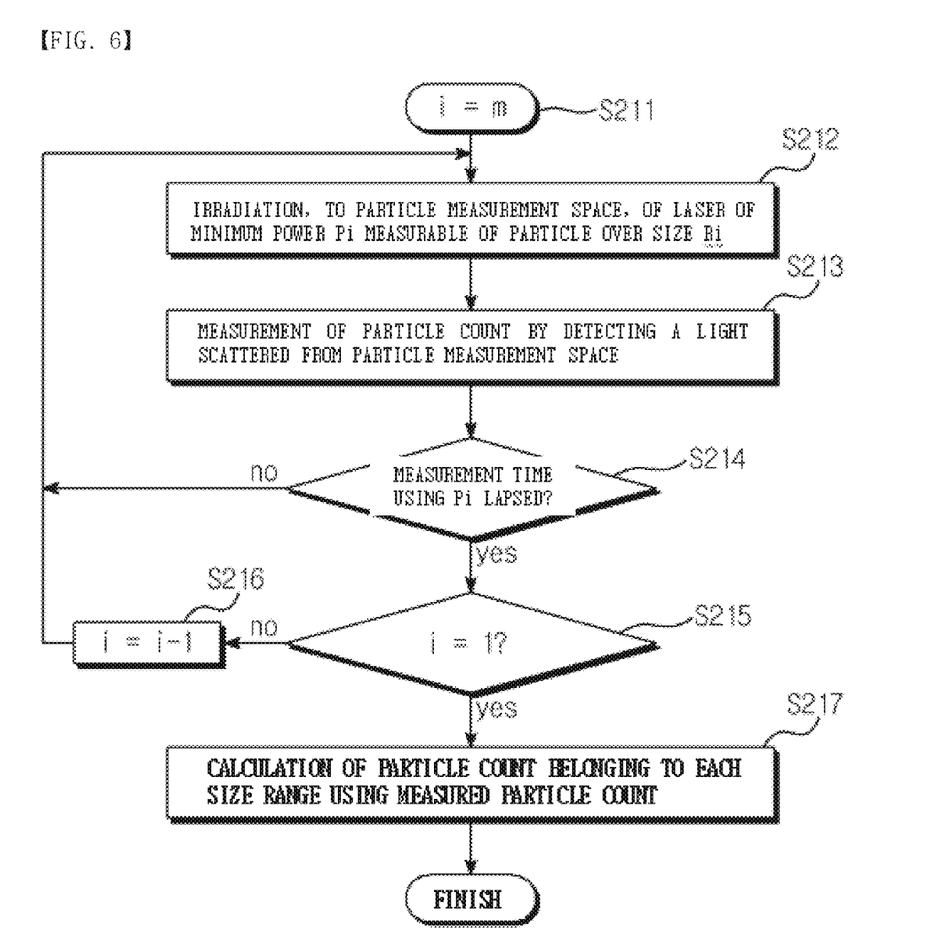
FIG. 6 illustrates a high-accuracy optical particle measuring method according to an exemplary embodiment of the present invention.

Referring to FIG. 6, an explanation will be made on a high-accuracy optical particle measuring method using a laser power scanning according to a first exemplary embodiment of the present invention.

The particle measuring method is a method measuring the count of particles per size range using the particle measuring part (100) thus far described.

First, a step of irradiating, by a light irradiation part (110), a minimum powered laser (Pi) capable of measuring only particles having more than relevant size to a particle measurement space for a predetermined time respectively in response to (S211, S215, S216) plural counts of each mutually different particle size (R1, R2, ..., Rm) (S212); and a step of measuring, by a measuring part (120), the counts of particles by detecting a light scattered from particles in the particle measurement space (S213) are implemented.

The steps of S212 and S213 are implemented for a predetermined period of time when a laser of each power is irradiated (S214).

The light irradiation part (110) at Step S212 may continuously irradiate lasers of powers respectively corresponding to each mutually different particle size without interruption, and sequentially irradiate starting from a laser of smaller size.

The measuring part (120) may calculate the counts of particles belonging to each size range by using the counts of particles measured through each laser irradiation after finishing all the steps of S212 and S213 relative to mutually different particle sizes (R1, R2, ..., Rm) (S217).

At this time, the size range for calculating the counts of particles by the measuring part (120) may be variably formed.

For example, the counts of particles may be calculated that belong to a section between two adjacent sizes of each particle size (R1, R2, ..., Rm) related to laser irradiation using the counts of particles measured through each laser irradiation. That is, the size range Ai for calculating, by the measuring part (120), the counts of particles by division or classification may be so configured as to include at least 'Ri≤Ai<R(i+1))' relative to each Ri.

Particularly, the counts of particles belonging to each section may be calculated through algorithm using a proportional relationship between the measured counts of particles and irradiated laser power.

The general method for calculating, by the measuring part (120), the counts of particles per size range may be implemented as explained through the abovementioned Mathematical Expression 2.

Now, hereinafter, a detailed example will be provided for calculating the counts of particles belonging to three (3) particle size ranges relative to particles having sizes of 300~1,000 nm.

Referring to Table 1, ni, which is a value sought to be calculated, is the count of particles belonging to each size range Ai, Pk is a minimum laser power measurable of minimum size particle of size range Ai, ni[Pk] is the count of particle of size range Ai measured when a laser having a Pk power is irradiated, and N[Pk] is a total count of particles measured when a laser having a Pk power is irradiated.

Figure 7:
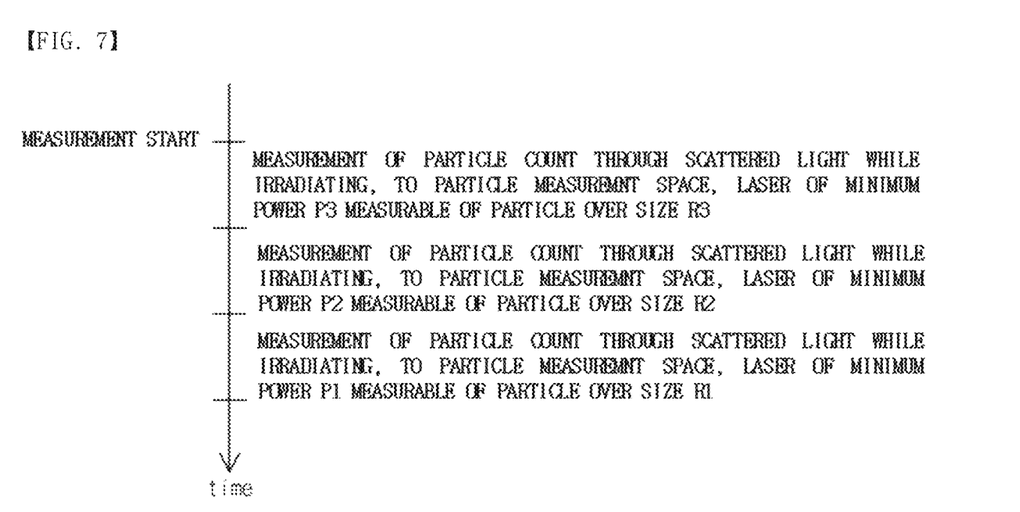
FIG. 7 is an example of explaining the sequential irradiation of laser with small power.

Referring to FIGS. 7 and 5, in light of the fact that the laser is irradiated staring from a smaller size, irradiation may be sequentially implemented from a laser of power P3 to a laser of power P1, as the measurement is started for particle counts.

Therefore, the order of measuring the counts of particles in Table 1 while the laser is irradiated may be opposite from the subscript order (row order).

While the laser of each power is irradiated, measurement of counts of particles through the measuring part (120) may be performed.

TABLE 1

| Particle size range ($A_i$) | $n_i$ (value to be sought) | minimum laser power (Pk) for measurement of minimum size particle of range ($A_i$) | ni[Pk] is particle count of range Ai when measurement is made with Pk power | total counts of particles measured with Pk power (N [Pk]) |
|---|---|---|---|---|
| Ai: 300~500 nm | n1 | P1 | n1[P1], n1[P2], n1[P3] | N[P1] |
| Ai: 500~700 nm | n2 | P2 | n2[P1], n2[P2], n2[P3] | N[P2] |
| Ai: >700 nm | n3 | P3 | n3[P1], n3[P2], n3[P3] | N[P3] |

The ni value, which is a value to be sought, may be expressed by the following Mathematical Expression 4.

$$n1 = n1[P1] + n1[P2] + n1[P3]$$

$$n2 = n2[P1] + n2[P2] + n2[P3]$$

$$n3 = n3[P1] + n3[P2] + n3[P3], \quad \text{[Mathematical Expression 4]}$$

where, each variable may be transformed by the following Mathematical Expression 5.

[Mathematical Expression 5]

$$ni[Pk] = 0, (i < k), \quad (1)$$

$$ni[Pk] = ni[Pk], (i = k), \quad (2)$$

$$ni[Pk] = (Pi/Pk) \times ni[Pi] \quad (3)$$

That is, because 'i<k' in the conversion formula (1) of Mathematical Expression 5 is a condition where a laser of small power is irradiated that cannot measure even the minimum size particle belonging to a relevant size range, it shows that the particle of relevant size range cannot be measured. For example, n1[P2]=0.

The Mathematical Expression 5 may become the following Mathematical Expression 6 when used with the conversion formula (1).

$$n1 = n1[P1] + 0 + 0$$

$$n2 = n2[P1] + n2[P2] + 0$$

$$n3 = n3[P1] + n3[P2] + n3[P3] \quad \text{[Mathematical Expression 6]}$$

When the condition is 'i>k' in the conversion formula (3) of Mathematical Expression 5, the count of particle of relevant size range may be calculated using a proportional expression of laser power. When an example of ni[Pk] value belonging to this condition is cited, there may be n3[P2].

When the conversion formula (3) of Mathematical Expression 5 is used, the following Mathematical Expression 7 may be sought.

[Mathematical Expression 7]

$$n1 = n1[P1] \quad (A)$$

$$n2 = (P1/P2) \times n2[P2] + n2[P2] \quad (B)$$

$$n3 = (P1/P3) \times n3[P3] + (P2/P3) \times n3[P3] + n3[P3] \quad (C)$$

As a result, a basic formula may be completed for obtaining ni value which is the count of particle belonging to each size range Ai.

The Mathematical Expression 7 is a theoretical equation for obtaining ni value, and therefore, ni[Pi] value for each power must be obtained. Examples of these values may be cited of n1[P1], n2[P2], and these values may be obtained through actual measurement processes.

$$N[P1] = n1[P1] + n2[P1] + n3[P1]$$

$$N[P2] = n1[P2] + n2[P2] + n3[P2]$$

$$N[P3] = n1[P3] + n2[P3] + n3[P3] \quad \text{[Mathematical Expression 8]}$$

The N[Pk] value in the Mathematical Expression 8 is a total count of particles when measurement was performed using Pk power in the actual measurement, and is a value for Pk irrespective of size range Ai.

When the conversion formula (1) of Mathematical Expression 5 is used, the Mathematical Expression 8 may be expressed as the following Mathematical Expression 9.

$$N[P1] = n1[P1] + n2[P1] + n3[P1]$$

$$N[P2] = 0 + n2[P2] + n3[P2]$$

$$N[P3] = 0 + 0 + n3[P3] \quad \text{[Mathematical Expression 9]}$$

Furthermore, when the conversion formula (3) is used, it may be expressed by the following Mathematical Expression 10.

$$N[P1] = n1[P1] + (P1/P2) \times n2[P2] + (P1/P3) \times n3[P3]$$

$$N[P2] = n2[P2] + (P2/P3) \times n3[P3]$$

$$N[P3] = n3[P3], \quad \text{[Mathematical Expression 10]}$$

where N[P1], N[P2], N[P3] are values observed in all measurements.

Therefore, when the Mathematical Expressions 7 and 10 are utilized, n1, n2, n3 may be transformed to functions of N[P1], N[P2], N[P3] as shown in the Mathematical Expression 11.

$$n3 = \frac{P1}{P3}N[P3] + \frac{P2}{P3}N[P3] + N[P3] \quad \text{[Mathematical Expression 11]}$$

$$= \left(\frac{P1+P2}{P3} + 1\right)n[P3]$$

$$n2 = \left(\frac{P1}{P2} + 1\right)\left(N[P2] - \frac{P2}{P3}n3[P3]\right)$$

$$= \left(\frac{P1}{P2} + 1\right)\left(N[P2] - \frac{P2}{P3}N[P3]\right)$$

$$n1 = N[P1] - \frac{P1}{P2}n2[P2] - \frac{P1}{P3}n3[P3]$$

$$= N[P1] - \left\{\frac{P1}{P2}\left(N[P2] - \frac{P2}{P3}n3[P3]\right)\right\} - \frac{P1}{P3}n3[P3]$$

-continued $$= N[P1] - \left\{\frac{P1}{P2}\left(N[P2] - \frac{P2}{P3}N[P3]\right)\right\} - \frac{P1}{P3}N[P3]$$

$$= N[P1] - \frac{P1}{P2}N[P2] + \left(\frac{P1}{P2}\frac{P2}{P3} - \frac{P1}{P3}\right)N[P3]$$

Figure 8:
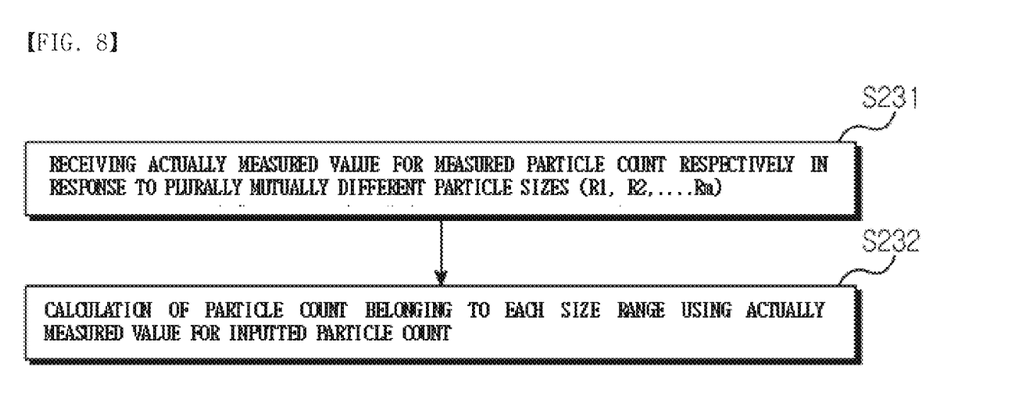
FIG. 8 illustrates a high-accuracy optical particle measuring method according to another exemplary embodiment of the present invention.

Meantime, a high-accuracy optical particle measuring method using a laser power scanning according to a second exemplary embodiment of the present invention relates to a method for accurately calculating, by a computer device, the count of particles belonging to each size range based on actually measured values on the particle counts.

Referring to FIG. 8, the high-accuracy optical particle measuring method using a laser power scanning according to a second exemplary embodiment of the present invention may be realized by including an input step (S231) and the calculation step (S232), and may be performed by a computer device.

Here, the computer device may be various types of devices. For example, the computer device may mean the measuring part (110) of the particle measurement device (110) according to the present invention, or another computer device capable of receiving or transmitting digital data in association with the measuring part (110).

The latter may include a manager computer device that provides various functions related to particle measurement in response to a user command while providing various UI (User Interface) screens.

The input step (S231) may receive inputs of actually measured values of particle counts measured respectively in response to a plurality of mutually different particle sizes (R1, R2, . . . , Rm).

Here, the actually measured values of particle counts may mean the counts of actually measured particles by detecting a light scattered from particles in a particle measurement space when a minimum powered laser capable of measuring particles greater than each size is irradiated into the particle measurement space for a predetermined period of time.

The input of actually measured values of particle counts in the input step (S231) may be realized in real time, and the actually measured values may be inputted in advance.

Furthermore, the calculation step (S232) may measure the particle count of per each size range using the actually measured values of particle counts inputted through the input step (S231), as explained with reference to the Mathematical Expression 2.

That is, when ni, which is a value sought to be calculated, is the count of particles belonging to each size range Ai (R1≤Ai<R(i+1)), Pk is a minimum laser power measurable of particle of size Rk, ni[Pk] is the count of particle of size range Ai measured when a laser having a Pk power is irradiated, and N[Pk] is a total count of particles measured when a laser having a Pk power is irradiated, particle counts per each size range may be measured using the relationship of:

$$ni = ni[P1] + ni[P2] + \ldots + ni[Pk];$$

$$ni[Pk] = 0, (i<k);$$

$$ni[Pk] = ni[Pk], (i=k); \text{ and}$$

$$ni[Pk] = (Pi/Pk) \times ni[Pi], (i>k).$$

Furthermore, the calculation step (S232) may measure the particle counts per size range using each method explained above as needed, and therefore, any further redundant explanations will be omitted.

The high-accuracy optical particle measuring method using laser power scanning according to the second exemplary embodiment of the present invention may be implemented as a code that can be written on a computer-readable recording medium and thus read by a computer system.

At this time, the computer-readable recording medium may be any type of recording device in which data is stored in a computer-readable manner and thus read by the computer system.

For example, the computer-readable medium may include, but are not limited to, ROM, RAM, CD-ROM, magnetic tapes, floppy disks, and optical data storage devices. Furthermore, the computer-readable media may be distributed to a computer system connected to a computer communication network and stored and implemented by a code that can be read in a distributed way.

Although the invention has been described based upon these preferred embodiments, it would be apparent to, and readily appreciated by, those of ordinary skill in the art that certain modifications, variations, and alternative constructions would be apparent, while remaining within the spirit and scope of the invention.

DESCRIPTION OF REFERENCE NUMERALS

30: particle
40: particle measurement space
100: particle measurement device
110: light irradiation part
120: measuring part

The invention claimed is:

1. A high-accuracy optical particle measuring apparatus using a laser power scanning, the apparatus comprising:
a light irradiator irradiating a minimum powered lasers capable of measuring only particles having more than relevant size to a particle measurement space for a predetermined time in response to plural counts of each mutually different particle size (R1, R2, . . . , Rm); and
a measurer measuring the counts of particles per size by allowing the laser irradiated through the light irradiation part to detect a light scattered from particles in the particle measurement space, wherein the measuring part is so configured as to calculate the counts of particles belonging to a particular section by using the counts of particles measured through each laser irradiation,
wherein the measurer measures the counts of particles per size range based on a mathematical expression of "ni=ni[P1]+ni[P2]+ . . . +ni[Pk]", when, ni is a count of particles of size range Ai (Ri≤Ai<R(i+1)) to be calculated, Pk is a minimum laser power measurable of particle of size Rk, ni[Pk] is a count of particles of size range Ai that is measured when a laser having the power of Pk is irradiated, and N[Pk] is a total count of particles measured when a laser having a power Pk is irradiated,
wherein $ni[Pk]=0, (i<k),$ $ni[Pk]=ni[Pk], (i=k),$ $ni[Pk]=(Pi/Pk) \times ni[Pi], (i>k).$ 2. The apparatus of claim 1, wherein the light irradiator continuously irradiates without interruption the minimum powered lasers respectively in response to each mutually different particle size.

3. The apparatus of claim 2, wherein the light irradiator sequentially irradiates starting from a smaller powered laser respectively in response to each mutually different particle size.

4. The apparatus of claim 1, wherein the counts of particles belonging to the particular section are calculated through an algorithm using a proportional relationship between the counts of measured particles and powers of irradiated laser.

5. A high-accuracy optical particle measuring method using a laser power scanning, the method comprising:
irradiating, by a light [i] irradiator, a minimum powered laser capable of measuring only particles having more than relevant size to a particle measurement space for a predetermined time in response to plural counts of each mutually different particle size (R1, R2, . . . , Rm) (first step); and
measuring, by a measurer, the counts of particles by detecting a light scattered from particles in the particle measurement space (second step), wherein the measuring part calculates the counts of particles belonging to a particular section using the counts of particles measured through the first step and the second step,
wherein the measurer measures the counts of articles per size range based on a mathematical expression of "ni=ni[P1]+ni[P2]+ . . . +ni[Pk]", when,
ni is a count of particles of size range Ai (Ri≤Ai<R(i+1)) to be calculated, Pk is a minimum laser power measurable of particle of size Rk, ni[Pk] is a count of particles of size range Ai that is measured when a laser having the power of Pk is irradiated, and N[Pk] is a total count of particles measured when a laser having a power Pk is irradiated,
wherein $ni[Pk]=0, (i<k),$ $ni[Pk]=ni[Pk], (i=k),$ $ni[Pk]=(Pi/Pk) \times ni[Pi], (i>k).$ 6. The method of claim 5, wherein the first step and the second step include sequentially irradiating a laser of power respectively in response to each mutually different particle size.

7. The method of claim 6, wherein the laser irradiation in the first step is implemented starting from a smaller powered laser.

8. The method of claim 5, wherein the count of particles belonging to the particular section is calculated through an algorithm using a proportional relationship between the counts of measured particles and powers of irradiated laser.

9. A high-accuracy optical particle measuring method using a laser power scanning, the method comprising:
receiving an input of an actually measured value for the counts of particles measured in response to each mutually different plural particle size (R1, R2, . . . , Rm), where the actually measured value for the counts of particles is defined by the count of particles measured by detecting a light scattered from particles in the particle measurement space while irradiating a minimum powered laser capable of measuring only particles having more than relevant size to a particle measurement space for a predetermined time in response to each size (inputting step); and
calculating the counts of particles belonging to a particular section using the actually measured value of counts of the inputted particles (calculating step), wherein, the calculating step includes measuring the counts of particles per size range based on a mathematical expression of "ni=ni[P1]+ni[P2]+ . . . +ni[Pk]", when, ni is a count of particles of size range Ai (Ri≤Ai<R(i+1)) to be calculated, Pk is a minimum laser power measurable of particle of size Rk, ni[Pk] is a count of particles of size range Ai that is measured when a laser having the power of Pk is irradiated, and N[Pk] is a total count of particles measured when a laser having a power Pk is irradiated, wherein $ni[Pk]=0, (i<k),$ $ni[Pk]=ni[Pk], (i=k),$ $ni[Pk]=(Pi/Pk)\times ni[Pi], (i>k).$ 10. The method of claim 9, wherein the input step and the calculation step are implemented by a measuring part of claim 1, or a computer device in association with the measuring part.

11. A non-transitory computer-readable recording medium recorded with a program for being implemented in a computer for the high-accuracy optical particle measuring method using a laser power scanning of claim 9.

12. A non-transitory computer-readable recording medium recorded with a program for being implemented in a computer for the high-accuracy optical particle measuring method using a laser power scanning of claim 10.

* * * * *